United States Patent [19]

Rehbein

[11] 4,175,496
[45] Nov. 27, 1979

[54] EARTH WORKING IMPLEMENT

[75] Inventor: Glenn Rehbein, Circle Pines, Minn.

[73] Assignee: Robark, Inc., Circle Pines, Minn.

[21] Appl. No.: 859,974

[22] Filed: Dec. 12, 1977

[51] Int. Cl.² ........................ A01C 1/04; A01B 59/00
[52] U.S. Cl. ....................................... 111/1; 172/328; 47/56
[58] Field of Search .................. 111/1, 63, 67; 47/56; 172/324–328, 458, 502, 668

[56] References Cited

U.S. PATENT DOCUMENTS

| | | | |
|---|---|---|---|
| 1,319,936 | 10/1919 | Wentworth | 171/134 X |
| 2,880,528 | 4/1959 | Lusk | 172/328 X |
| 3,019,747 | 2/1962 | Strahan | 111/63 |
| 3,554,295 | 1/1971 | Kopaska | 172/502 X |
| 3,777,823 | 12/1973 | Holfeld | 172/328 |
| 3,905,313 | 9/1975 | Grether | 111/1 |
| 3,980,029 | 9/1976 | Huggett | 111/1 |

*Primary Examiner*—Robert E. Bagwill

[57] ABSTRACT

An earth working implement is disclosed for installing plastic netting under seeded earth for the growth of grass sod. The implement may be drawn by a tractor and is configured to continuously lay netting on the ground and automatically cover the netting with an appropriate layer of earth containing seed.

1 Claim, 4 Drawing Figures

U.S. Patent  Nov. 27, 1979  Sheet 1 of 2  4,175,496
FIG. 1
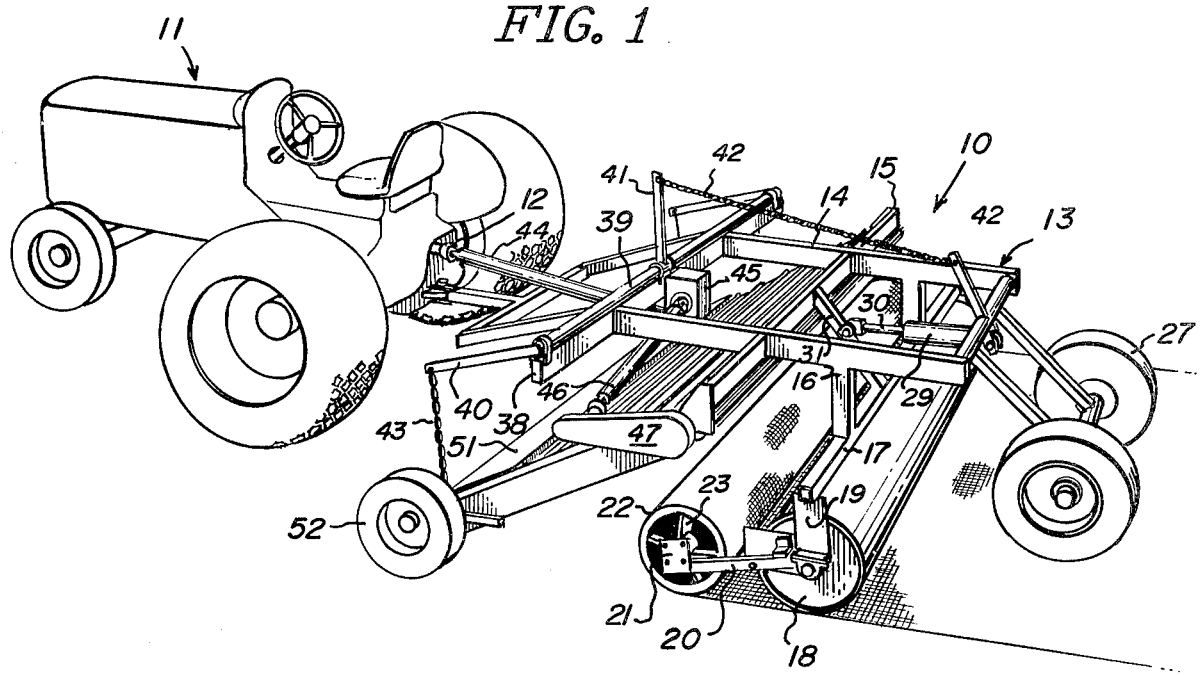
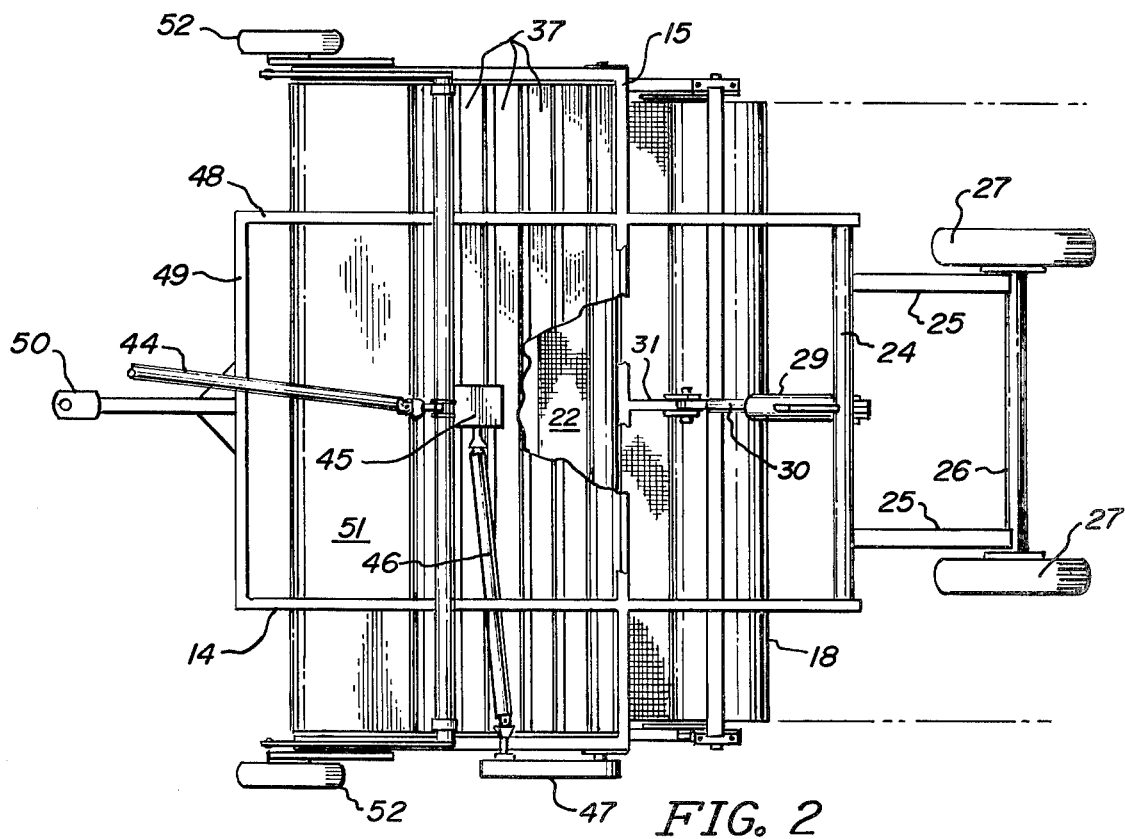
FIG. 2

EARTH WORKING IMPLEMENT

BACKGROUND OF THE INVENTION

This invention relates to the field of earth working implements and more specifically to that class of implements useful in the planting of seed beds for the production of grass sod.

The use of pregrown grass sod is well-known and is commonly used in landscaping when it is undesireable to plant and grow seed in the area where grass is desired. For such purposes, sod is grown in large agricultural areas referred to as sod farms wherein the grass sod is grown as a corp. After the sod is grown it is harvested by cutting below the soil level of the grass roots and rolling up the sod for transporting to and transplanting at the desired site.

Inasmuch as the sod is bound together solely by the root system of the grass itself, it is somewhat fragile and subject to breaking and tearing apart. In order to alleviate this problem, which can result in costly losses and unusable sections of sod, a plastic netting has been devised for use in strengthening the sod. Such netting is produced in a fenestrated pattern of about one inch squares and is laid under the topsoil in which the grass seed has been planted. As the grass root system grows, it is intimately intertwined in the netting whereby the netting lends support to the roots and hence the sod. When the sod is cut and harvested the netting remains in the cut soil layer to lend strength and stability to the sod.

While the use of such netting has been shown to be desirable, heretofore no satisfactory method of automatically laying and burying such netting in a seed bed had been developed, especially in a large commerical operation where several acres or hundreds of acres of sod is grown at a time.

Prior attempts have been directed to forcing the netting down into the topsoil through the use of rolling force or pressure from about. This technique has not proved successful in seating the netting at the appropriate level and establishing a satisfactory sod bed.

The present invention overcomes the disadvantages of the prior art techniques and provides an apparatus whereby netting can be installed under the seeded topsoil in an automatic fashion to a controllable depth without harming the seed bed itself. These and other advantages of the present invention will become obvious as the description proceeds.

SUMMARY OF THE INVENTION

The present invention provides an earth working implement adapted to be drawn behind a tractor, said tractor also providing driving power for the moving portions of the implement. The implement includes a drive means; an earth engaging assembly having a plurality of orbiting blades for scooping topsoil and transporting it to a discharge point; a net carrying and dispensing means for laying netting from a roll along the ground, the earth engaging assembly depositing the topsoil onto the netting as it is laid. The orbital speed of the earth engaging assembly can be adjusted to provide any desired depth of topsoil and the implement preferably includes a following roller for compacting and smoothing the net containing seed bed. Appropriate hydraulic cylinders and chain drives are provided for moving and operating the components of the implement.

DESCRIPTION OF THE DRAWINGS

FIG. 1 is a prespective view of the earth working implement of the present invention showing it in a trailing position behind a tractor;

FIG. 2 is a top plan view of the implement of FIG. 1;

DESCRIPTION OF PREFERRED EMBODIMENTS

Figure 3:
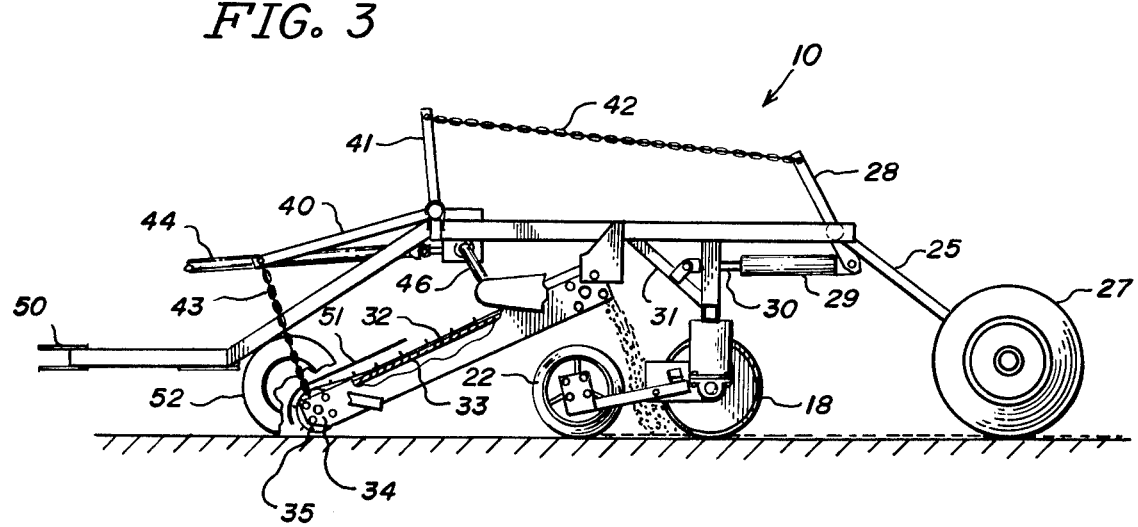
FIG. 3 is a side view in elevation of the implement in an operating position for dispensing netting; and, FIG. 4 is another side elevational view similar to FIG. 3 in which the implement is in a non-operating, traveling position.

The perspective view of FIG. 1 depicts the earth working apparatus of the present invention in an operating configuration. The implement, designated generally at 10, is adapted to be towed behind a tractor 11 which provides both the movement of the implement and also the power for its moveable element through a standard tractor power take-off 12.

The implement includes a heavy frame 13, shown clearly in FIG. 2, comprising longitudinal members 14 and lateral members 15. Legs 16 depend from the longitudinal members 14, said legs in turn supporting a crosspiece 17. Mounted on the crosspiece 17 is a roller 18, rotatably mounted on plate portions 19 of the crosspiece 17.

Support arms 20 extend forwardly from the plate portions 19, the support arms providing a bracket 21 at their outer ends, the brackets adapted to receive a roll of standard sod netting therebetween. The net roll 22 can be sleeved over a carrier 23 to be carried by the brackets 21 at each end of the roll in a manner allowing the roll to rotate and allow the net to be unrolled therefrom.

Mounted between the longitudinal members 14 at their rearmost ends is a cross-member 24 which is mounted to allow it to rotate about a horizontal axis. Braces 25 are attached to the cross-member 24, the braces 25 in turn supporting an axle 26 to which are mounted wheels 27. An arm 28 is fixed to the cross-member 24 toward the mid-point thereof, and a hydraulic cylinder 29 is attached to the lower portion of the arm 28 below the axis of rotation of cross-member 24. The piston rod 30 of the cylinder is fixed to brace 31 which forms part of the frame 13.

A generally flat, pan-shaped apron 32 is mounted in the forward end of the frame 13. The apron 32 includes side walls 33 and an axle 34 is mounted in each end of the side walls, the axles 34 extending horizontally across apron 32. Sprockets 35 are attached to the axles 34 at their ends, the sprockets being interconnected on each side by means of chains 36 which run along and generally follow the perimeter contour of side walls 33. When the sprockets 35 are rotated, the chains 36 move in an orbital path between the front and rear sprockets generally along the perimeter of the side walls 33.

A plurality of L-shaped blades 37 are mounted across the apron 32 parallel to the axles 34 and operably connected to the chains 36 to be driven thereby. The blades 37 are installed so that one leg of the L lies flat on the apron 32 while the other leg protrudes from the apron in a direction which stays generally perpendicular thereto throughout the travel of the blades along the orbital path.

A shroud cover 51 overlies the forward portion of the apron 32, beginning at a point at the leading edge and curving around the front of the apron and the forwardmost portion of the top surface of the apron. Wheels 52 are mounted at each end of the forward axle 34.

An elongated cross-member 38 is mounted between the longitudinal members 14 at the forwardmost ends thereof. A rotatable member 39 is mounted to and vertically adjacent crossmember 38 to be supported thereby. An arm 40 is rigidly attached to each end of member 39 and a third arm 41 is attached to the member 39 at approximately the center thereof. The center arm 41 and the pair of end arms 40 are offset from each other approximately 90 degrees. Center arm 41 is connected to arm 28 by means of a chain or cable 42. End arms 40 are attached to the forwardmost portion of apron 32 by means of chains or cables 43.

A driveshaft 44 extends rearwardly from the power take-off 12 to a gear box 45 mounted to the cross-member 38. A second driveshaft 46 extends from the gear box 45 to a drive sprocket at its end, the sprocket being hidden in the drawings by chain guard 47. A drive chain carried inside guard 47 extends from the sprocket to a similar sprocket attached to axle 34 at the rearmost end of apron 32.

Completing the forward end of frame 13 is a pair of forward members 48 connected by crosspiece 49 to which tongue 50 is attached, the tongue being adapted for connection to the tractor 11.

OPERATION

Figure 4:
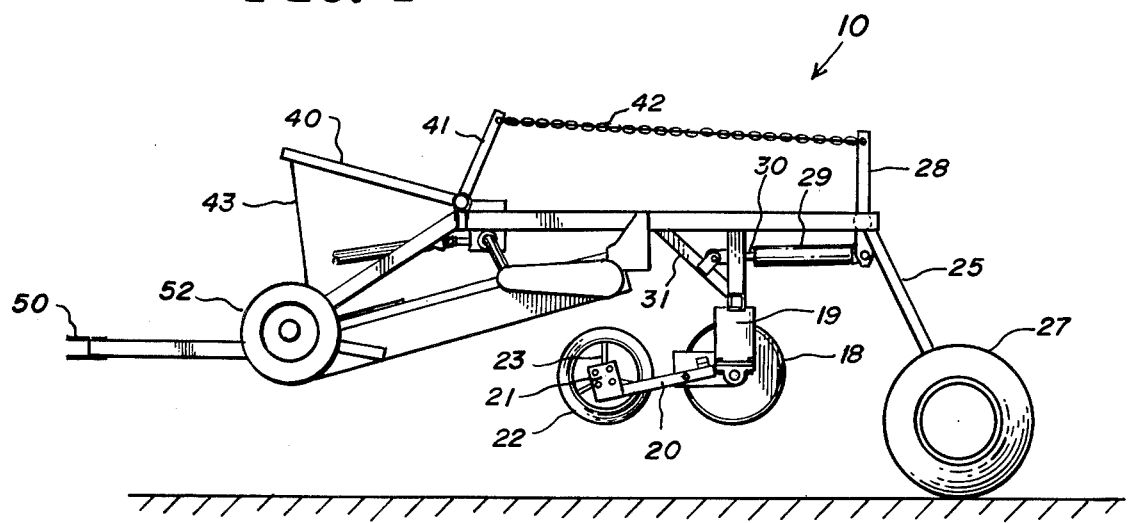

The operation of the implement can best be understood by reference to FIGS. 3 and 4. In FIG. 3 the implement is in an operating position wherein roller 18, wheels 52, and the leading edge of apron 32 are in contact with the ground. The net roll 22 may also lie on the ground although it can be slightly above ground as actual contact is not essential. The soil to be worked has been prepared by plowing and discing to produce a smooth, loose topsoil. The grass seed can have already been spread on or in the topsoil or it can be added after the netting is installed if desired. Good results have been obtained when the seed is already spread in the topsoil.

Power from the power take-off 12 is transmitted through the driveshafts 44 and 46 to the apron chain drive. The drive chains 35 are caused to orbit about axles 34, driving the blades 37 in a generally clockwise orbital path as viewed in the drawings. The blades scoop up the topsoil as they pass around the front sprocket 35 and carry it upwardly and rearwardly along the apron 32. The shroud cover 51 prevents the soild from being thrown forwardly off the apron and instead keeps the soil on the blades 37 until they have rotated to the top surface of the apron 32. When the blades reach the rear sprockets 35 and pass around the rearmost axle 34, the soil is deposited from the back of the apron 32, falling between the net roll 22 and roller 18.

The netting from roll 22 is unwound in a counterclockwise direction from the bottom of the roll, passing under roller 18. As the implement is pulled along the ground, the weight and pressure of roller 18 pulls the netting from the roll 22. The soil falling from the apron falls upon and covers the netting. The precise depth of topsoil deposited on the netting is a function of the forward speed of the tractor and the orbital speed of the blades 37. These parameters can be easily adjusted to provide an optimum depth of soil on the netting.

The following roller 18 passes over the freshly deposited topsoil and provides the proper compaction to firmly seat the netting, soil and seed on the ground.

When it is desired to trail the implement in a non-operating travel mode, hydraulic cylinder 29 is actuated to its closed or compressed position. This action pulls the lower portion of arm 28 forwardly, causing the braces 25 and hence wheels 27 to move forwardly as well. Because of the length of braces 25 this causes the central portion of the implement, namely roller 18 and net roll 22 to be raised off the ground. At the same time, chain 42 pulls arm 41 rearwardly, rotating arms 40 upwardly and lifting the leading edge of apron 32 up off the ground. When cylinder 29 is in its fully retracted position the implement is in the configuration shown in FIG. 4.

Thus it can be seen that the apparatus of the present invention effectively installs the netting below the topsoil surface by lifting a portion of the topsoil, laying the netting down on the ground from which the soil has been lifted, and redepositing the soil over the netting. The following roller compacts the soil and netting into place. The result is a smooth seeded bed with the netting in place under the desired depth of topsoil.

While the precise structure of the implement has been described in detail for purposes of complete explanation, it will be understood that various modifications can be made in the apparatus by those skilled in the art without departing from the spirit of the invention, whose scope is to be defined in the appended claims.

I claim:

1. In an apparatus for installing netting beneath a layer of seeded topsoil for producing net-reinforced grass sod, said apparatus adapted to be trailed behind a tractor and including means for transferring power from said tractor to said apparatus, and further comprising a net roller for dispensing a layer of netting along the ground as the apparatus is trailed, earth moving blades moveable about an apron for lifting soil from the earth and transporting it rearwardly along said apron to deposit it on the netting, and a compacting roller to compact said soil after deposit onto said netting, the improvement comprising:

a pair of wheels rotatably mounted to said apparatus and moveable between a first operating position wherein said net roller, said earth moving blades and said compacting roller are all at least in part contact with the ground; and a second traveling position wherein said net roller, said earth moving blades and said compacting roller are raised above the ground and said apparatus may be freely trailed behind said tractor; and a first lever arm operably connected to a support frame for said pair of wheels, said first lever arm having a hydraulic cylinder connected thereto on a first side of its rotational axis and a chain connected thereto on a second side of its rotational axis, said chain being further connected to a second lever arm, said second lever arm being operably connected to a support frame for said apron, actuation of said cylinder causing said first arm to rotate and to in turn rotate said second arm by tension on said chain, whereby actuation of said cylinder simultaneously causes said wheels to move to said traveling position and said net roller, earth moving blades, and compacting roller to be raised.

* * * * *